United States Patent
Kania et al.

(10) Patent No.: US 11,461,292 B2
(45) Date of Patent: Oct. 4, 2022

(54) QUICK DATA EXPLORATION

(71) Applicant: INTERNATIONAL BUSINESS MACHINES CORPORATION, Armonk, NY (US)

(72) Inventors: Tomasz Kania, Tarnów (PL); Tymoteusz Gedliczka, Cracow (PL); Szymon Brandys, Cracow (PL); Krzysztof Pitula, Tarnów (PL); Maciej Madej, Cracow (PL); Piotr Grzywna, Cracow (PL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 182 days.

(21) Appl. No.: 16/918,276

(22) Filed: Jul. 1, 2020

(65) Prior Publication Data

US 2022/0004527 A1  Jan. 6, 2022

(51) Int. Cl.
| | |
|---|---|
| *G06F 16/21* | (2019.01) |
| *G06N 20/00* | (2019.01) |
| *G06K 9/62* | (2022.01) |
| *G06F 16/2458* | (2019.01) |

(52) U.S. Cl.
CPC ........ *G06F 16/212* (2019.01); *G06F 16/2462* (2019.01); *G06K 9/6256* (2013.01); *G06N 20/00* (2019.01)

(58) Field of Classification Search
CPC . G06F 16/212; G06F 16/2462; G06K 9/6256; G06N 20/00
See application file for complete search history.

(56) References Cited

U.S. PATENT DOCUMENTS

| | | | |
|---|---|---|---|
| 6,308,168 B1 | 10/2001 | Dovich | |
| 8,805,835 B2 | 8/2014 | Davis | |
| 9,753,962 B2 | 9/2017 | Petschulat | |
| 2015/0134694 A1* | 5/2015 | Burke | G06F 16/245 707/769 |
| 2016/0092476 A1 | 3/2016 | Stojanovic | |
| 2018/0137181 A1* | 5/2018 | Abraham | G06F 16/2282 |
| 2018/0144265 A1 | 5/2018 | Bonawitz | |

(Continued)

FOREIGN PATENT DOCUMENTS

| | | |
|---|---|---|
| CN | 108475252 A | 8/2018 |
| CN | 110413765 A | 11/2019 |

OTHER PUBLICATIONS

Nguyen,, "Distributed and High Performance Big-File Cloud Storage Based on Key-Value Store", Jul. 2016, ResearchGate, https://www.researchgate.net/publication/306438908, pp. 1-15.

(Continued)

*Primary Examiner* — Dangelino N Gortayo
(74) *Attorney, Agent, or Firm* — Douglas M. Crockatt

(57) ABSTRACT

A computer-implemented method for quick data exploration of data to be uploaded may be provided. The method comprises uploading, from a local system, a first data set of a first size and determining that the first data set is not corrupted. The method also comprises in parallel to the uploading performing selecting from the first data set a predefined number of records and building a second data set, determining statistical data and metadata about the first data set, and visualizing the second data set, the statistical data and the metadata.

20 Claims, 6 Drawing Sheets

(56) References Cited

U.S. PATENT DOCUMENTS

| | | |
|---|---|---|
| 2020/0202171 A1 | 6/2020 | Hughes |
| 2020/0279364 A1* | 9/2020 | Sarkisian .............. G06F 16/252 |
| 2021/0019338 A1* | 1/2021 | Grampurohit ........ G06F 3/0481 |
| 2021/0295104 A1* | 9/2021 | Squires ................. G06F 16/176 |
| 2022/0003102 A1* | 1/2022 | Patel ..................... G06F 16/215 |

OTHER PUBLICATIONS

Notification of Transmittal of the International Search Report and Written Opinion of the International Searching Authority, or the Declaration, International application No. PCT/IB2021/055202, dated Sep. 24, 2021, 8 pages.

* cited by examiner

QUICK DATA EXPLORATION

BACKGROUND

Field of the Invention

The invention relates generally to uploading large amounts of data from a client system to a server, and more specifically, to a computer-implemented method for quick data exploration of data to be uploaded. The invention relates further to a data exploration system for a quick data exploration of data to be uploaded, and a computer program product.

Technical Environment/Related Art

These days, AI (artificial intelligence) is omnipresent in enterprises of any size and in many types of enterprise and consumer applications. Thus, a large community of developers is involved in developing or integrating AI technologies. As a consequence, and because large amounts of computing resources are typically required to train machine-learning models, such services are often implemented as central services or cloud-computing based services.

A traditional machine-model learning method is based on machine-learning algorithms and uses a known set of data samples together with related annotations in order to train a general model capable of predicting annotations for unseen data samples. For example, a deep learning model for image classification is trained on a set of input images and associated image class labels. Later, during a testing stage, this machine-learning (ML) model is used to predict an image class label for a new unseen image. Input data samples may include a mixture of annotated and not-annotated data samples which are processed together during training phases.

From a general point of view, input data samples are either available as captured input data or they may be generated by data generators. Data generators may be represented as real-world sensors (e.g., still photo cameras or video cameras, audio systems), human beings (e.g., text authors) or, simulators (artificial systems aiming to produce a certain type of data samples). A traditional data recognition method may operate with a fixed annotated number of training samples which may form a training set of data samples. These training data sets are typically comparatively large.

The developer of the machine-learning model typically needs to develop an understanding of the structure of the available training data in order to select an appropriate machine-learning algorithm. Typically, in this phase, many tests and error cycles in a trial-and-error form are required in order to select an appropriate AI algorithm with associated hyper-parameters for a given problem and available training data.

Because large amounts of computing capacities are required during the training sessions, the training, the data inspection, the testing phase and so on are done on centralized computing resources, whereas the developer continues to work on his local workstation. However, typically the large training data sets have to be uploaded to the central resource which may be very time-consuming resulting in unproductive times of the developer.

There are several disclosures related to a computer-implemented method for quick data exploration of data to be uploaded.

Document U.S. Pat. No. 8,805,835 B2 discloses systems, methods and techniques for managing data sets, in particular, representing, acquiring and disseminating large data sets and data files using metadata. The data representation, acquiring and disseminating large data sets and data files using metadata are described.

Document U.S. Pat. No. 6,308,168 B1 discloses a data representation module representing panels that are driven by metadata to allow the user to configure the presentation of information from a computer database system. The data presentation module is customized for the user's environment by configuring the metadata tables upon initial installation of the data presentation module software. Changes to the panels presented by the data presentation module can be performed by changing the metadata tables and without modifying the data presentation module software.

A disadvantage of known solutions may be that a transmission or uploading of data from a local system to a server continues to require significant amounts of time slowing down the productivity of a data scientist when developing ML models.

Therefore, there may be a need to overcome the disadvantage of not being able to continue to work with the data while being uploaded, in particular, in the context of developing machine-learning algorithms.

SUMMARY

According to one aspect of the present invention, a computer-implemented method for quick data exploration of data to be uploaded may be provided. The method may comprise uploading, from a local system, a first data set of a first size and determining that the first data set is not corrupted. The method may also comprise, in parallel to the uploading, performing also selecting from the first data set a predefined number of records building a second data set, determining statistical data and metadata about the first data set, and visualizing the second data set, the statistical data and the metadata.

According to another aspect of the present invention, a data exploration system for a quick data exploration of data to be uploaded may be provided. The system may comprise means for uploading, from a local system, a first data set of a first size and means for determining that the first data set is not corrupted. Furthermore, the system may comprise means for selecting from the first data set a predefined number of records building a second data set, means for determining statistical data and metadata about the first data set, and means for visualizing the second data set, the statistical data and the metadata. Thereby, the means for selecting, the means for determining statistical data and metadata and the means for visualizing may operate timewise in parallel to the means for uploading.

The proposed computer-implemented method for quick data exploration of data to be uploaded may offer multiple advantages, technical effects, contributions and/or improvements:

Data scientists working in an environment comprising a local system, i.e., a local workstation using a thin client, e.g., a web browser as user interface, and a server system with much more computing resources used to execute the training for an ML model, may save a lot of time, be more productive and may allow a better use of the available computing resources. Because developing ML models require a lot of back and forth, a lot of trial and error and a substantial amount of experimenting with the data, a transmission time or uploading time from the local system to the server may slow down the productivity of the data scientist significantly. This is also a consequence of experimenting with different sets of training data which may have to be uploaded from the local system to the server.

The proposed concept may allow the data scientist to continue his experiments and data exploration during the uploading of the training data from the local system to the server based on a representative subset of the first data set which is in the process of being uploaded from the local system to the server.

The statistical data as well as the metadata derived from the first data set may help the user or data scientist to get an impression about the selected training data, and may build a basis for configuring additional tools for data cleansing, data normalization, data correction and or data adoption. The so configured tools may then be applied to the first data set. Thereby, the user or data scientist may not be limited to run the tool on the local system or on the server to which the first data set may have been uploaded.

The proposed concept may not limit the freedom of the data scientist in experimenting and adapting with the data before starting an ML training process but giving him more time and flexibility in working with only a subset—in particular the second data set—in order to increase his productivity and in order to use the available resources, in particular computing resources, be much more productive because he can work with the second dataset which may be representative for the first data set and which only requires little resources for a quick data exploration.

In the following, additional embodiments of the inventive concept—applicable for the method as well as to the system—will be described.

According to one advantageous embodiment of the method, the statistical data comprising at least one out of the group comprising minimum values—in particular of data values of a column—maximum values, median values, mean values, quartile values, frequencies of data, an amount of missing data values (e.g., in specific records or specific columns). It may also be possible to determine additional statistical data which go beyond the classical meaning of metadata of a data set.

According to a further advantageous embodiment of the method, the metadata comprise at least one out of the group comprising number of rows, number of columns, and types of column fields. Additionally, the metadata may also comprise additional data about the data in the first data set. This may, for example, comprise also the size and type of records, the total amount of data and also explicit metadata, e.g., added at the beginning or the end of the first data set. Such additionally appended metadata may only be extracted from the first data set.

According to one permissive embodiment, the method may also comprise sending, in parallel to the uploading of the first data set, also the statistical data and metadata. The sending destination may be the same destination used for the first data set. The statistical data may or may not be stored locally, i.e., they may also be transmitted from the local, client system to a server via a REST (representational state transfer) request.

According to an optional embodiment of the method, the determining that the first data set is not corrupted may be performed before the uploading is started. This has the advantage that a data corruption and thus most probably and impossible correct transmission may be detected early on in the process. Upon a detection of corrupted data, the uploading may be suppressed and a warning for the user may be generated. Hence, a failure may be detected early on ("fast failure") and not at the end of the transmission, if, e.g., a checksum may be built to confirm a correct and completed transmission which may not have happened.

According to one useful embodiment of the method, a destination of the uploading may be a cloud-computing based service. In one embodiment, the cloud-computing based service may be a machine-learning algorithm to be trained with the uploaded first data set.

According to one advantageous embodiment, the method may also comprise configuring—and potentially also executing—a tool (e.g., a data modeling tool or another data manipulation tool) by using the statistical data, the metadata and/or the second data set in parallel to the uploading. Thus, the configuration of the tool may be locally on the client system or remotely on the server system. However, in the second case, it may also be useful to upload—in particular in parallel to uploading the first data set—the second data set to the server. On the other side, it may be advantageous to configure the tool locally on the client during the uploading and use the uploaded configuration on the server-side. Hence, the data scientist using the proposed method is not limited by the system on which the tool is configured and executed.

Thus, and according to a further advantageous embodiment, the method may also comprise executing the configured tool on the first data set, in particular on the server. Especially in the case of a configuration of the tool on the client-side this feature may be used advantageously. Additionally, it may be required to transmit the configuration data from the client to the server-side tool.

According to one preferred embodiment of the method, the size of the second data set may be a small fraction of the size of the first data set. Typically, the second data set may comprise about 1000 records (or even less). This may represent a typical number to get an initial training of a machine-learning tool or an idea of required data modeling in order to train the machine learning system on the server-side with a much larger number of training data. Furthermore, the relationship between the second data set to the first status set in terms of the size of the data set may be in the range of, e.g., $1/100$, $1/1000$, $1/10,000$, or the like. One of the things a data scientist needs to be aware of is that data may be asymmetric; i.e., a prediction about a behavior of a group of people shall be made and the training data shall represent the group of people equally in all its aspects, e.g., gender, ethnicity, age, health, education, etc. Thus, the data scientist needs to make sure that the training data have roughly the same amount of records to each appropriate aspect in order to not risk a single-sided bias of the ML model.

According to one permissive embodiment of the method, the selecting from the first data set may comprise selecting data from the beginning, the middle, the end, randomly or, according to a predefined algorithm from the first data set. The selection process may, in particular, be dependent on the type of data available, the machine-learning system to be trained, the source of the data, and expected bias of the data, and many more parameters.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
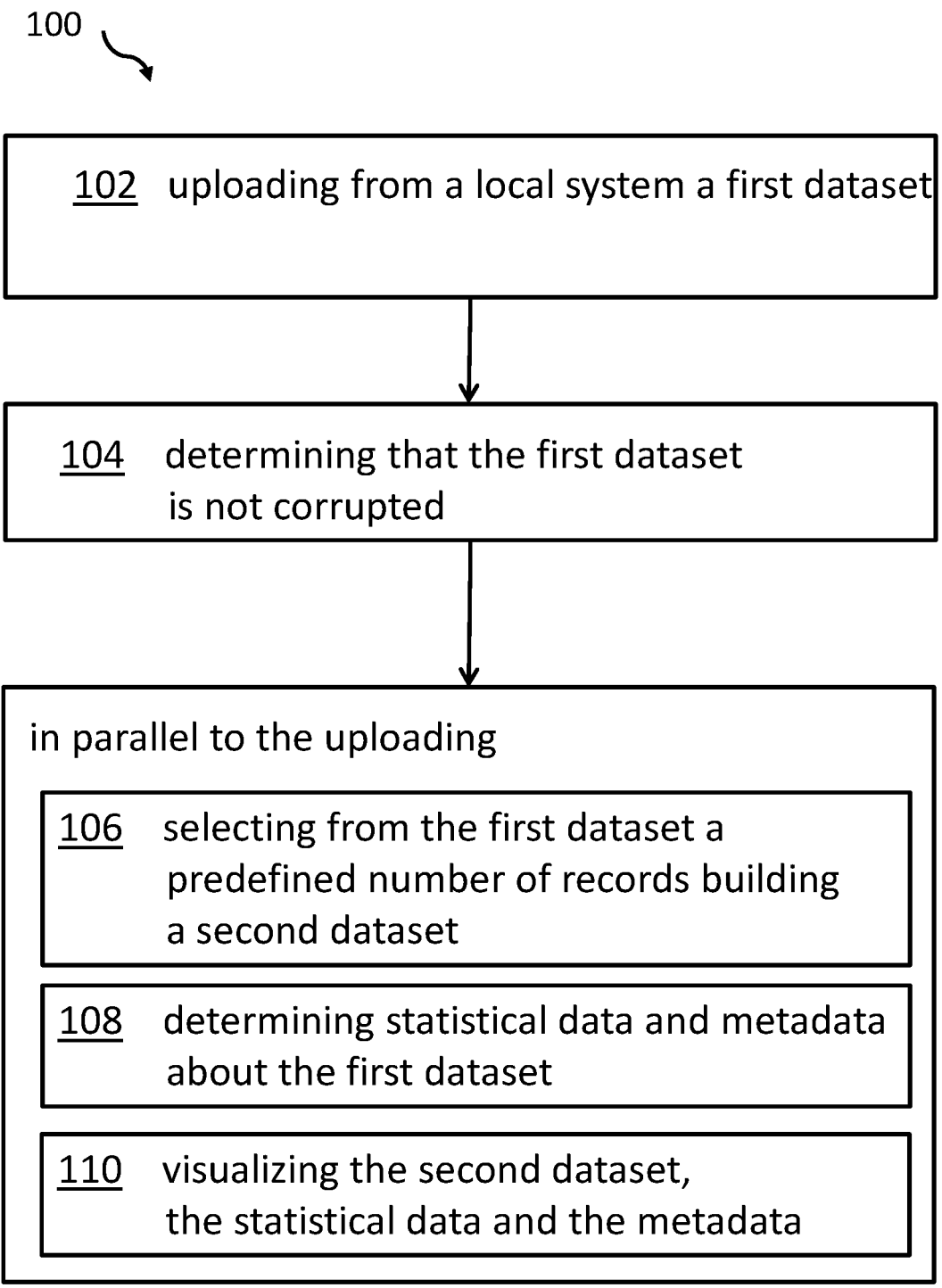

Preferred embodiments of the invention will be described, by way of example only, and with reference to the following drawings:

FIG. 1 shows a block diagram of an embodiment of the inventive computer-implemented method for quick data exploration of data to be uploaded.

Figure 2:
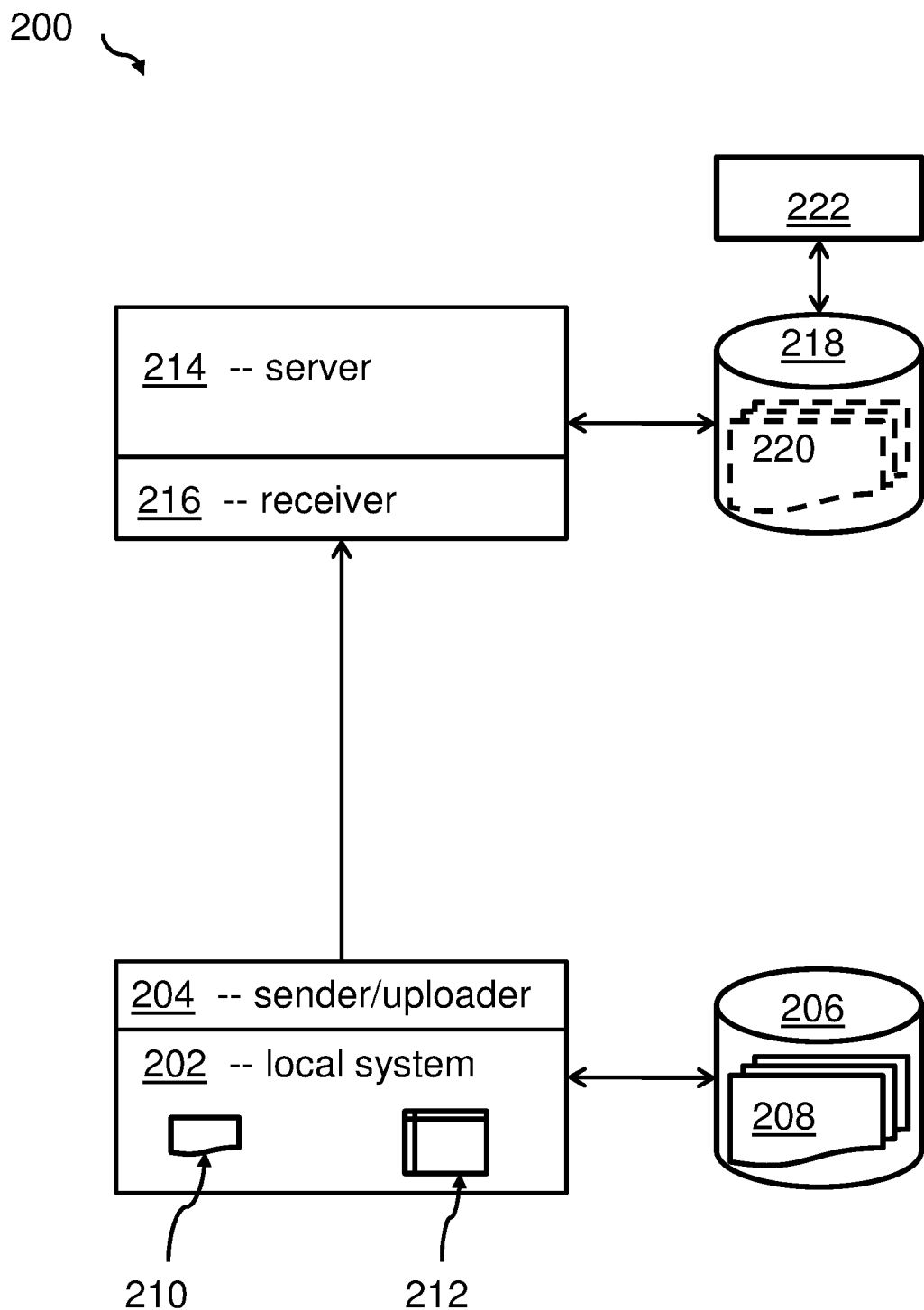

FIG. 2 shows a block diagram of a subset of some technical components for executing the method, according to an embodiment.

Figure 3:
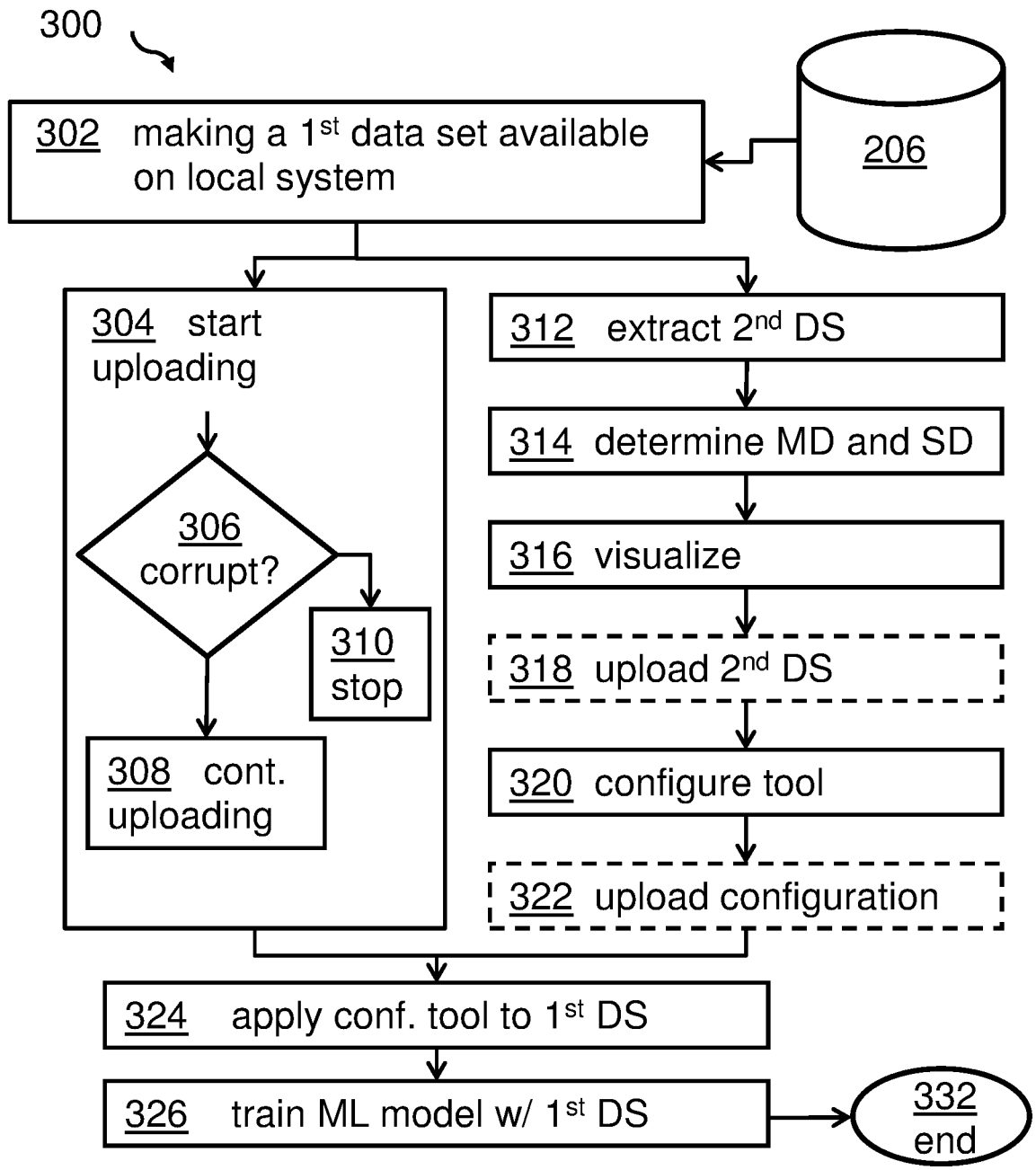

FIG. 3 shows a flowchart of an embodiment of the here proposed concept.

Figure 4:
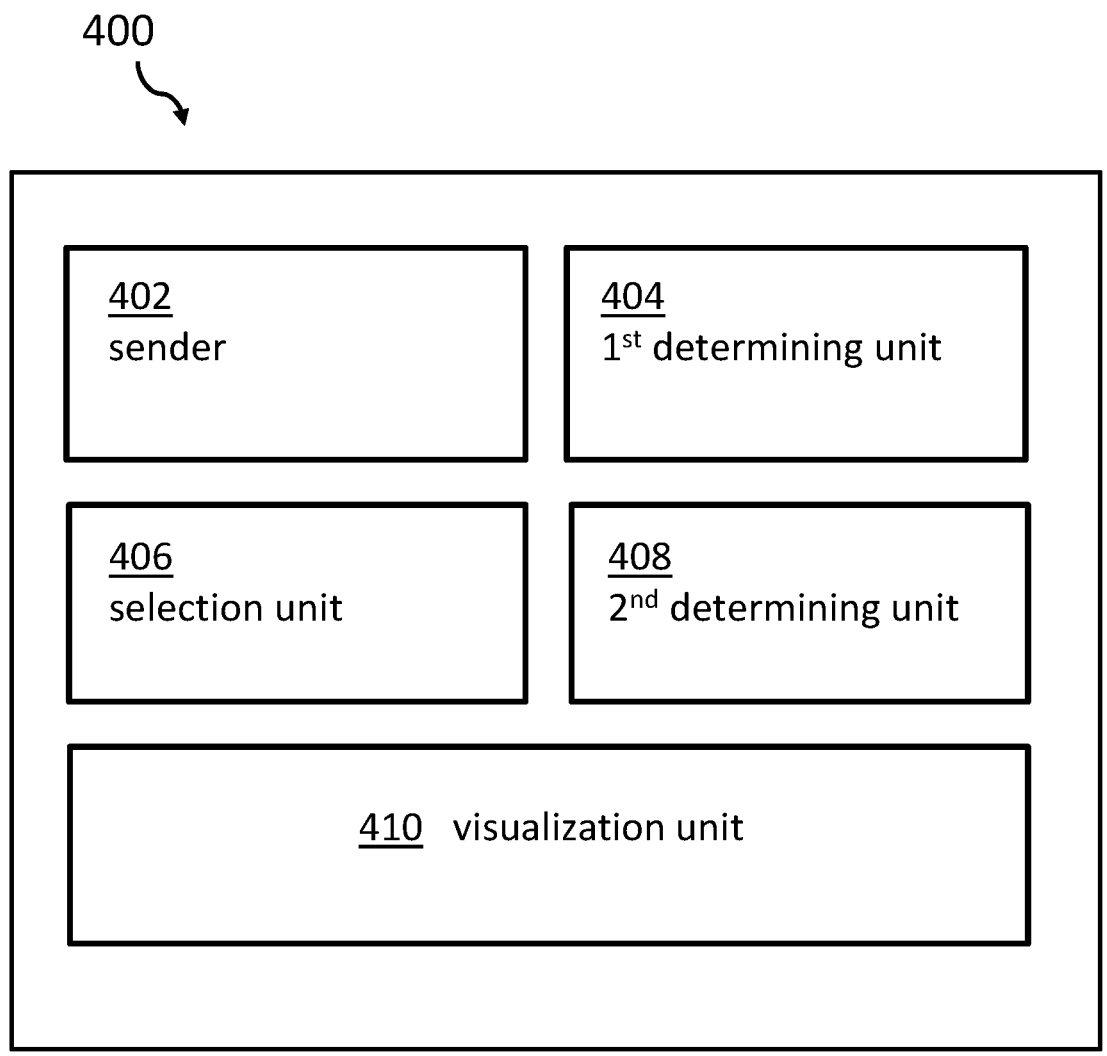

FIG. 4 shows a block diagram of an embodiment of a data exploration system for quick data exploration of data to be uploaded.

Figure 5:
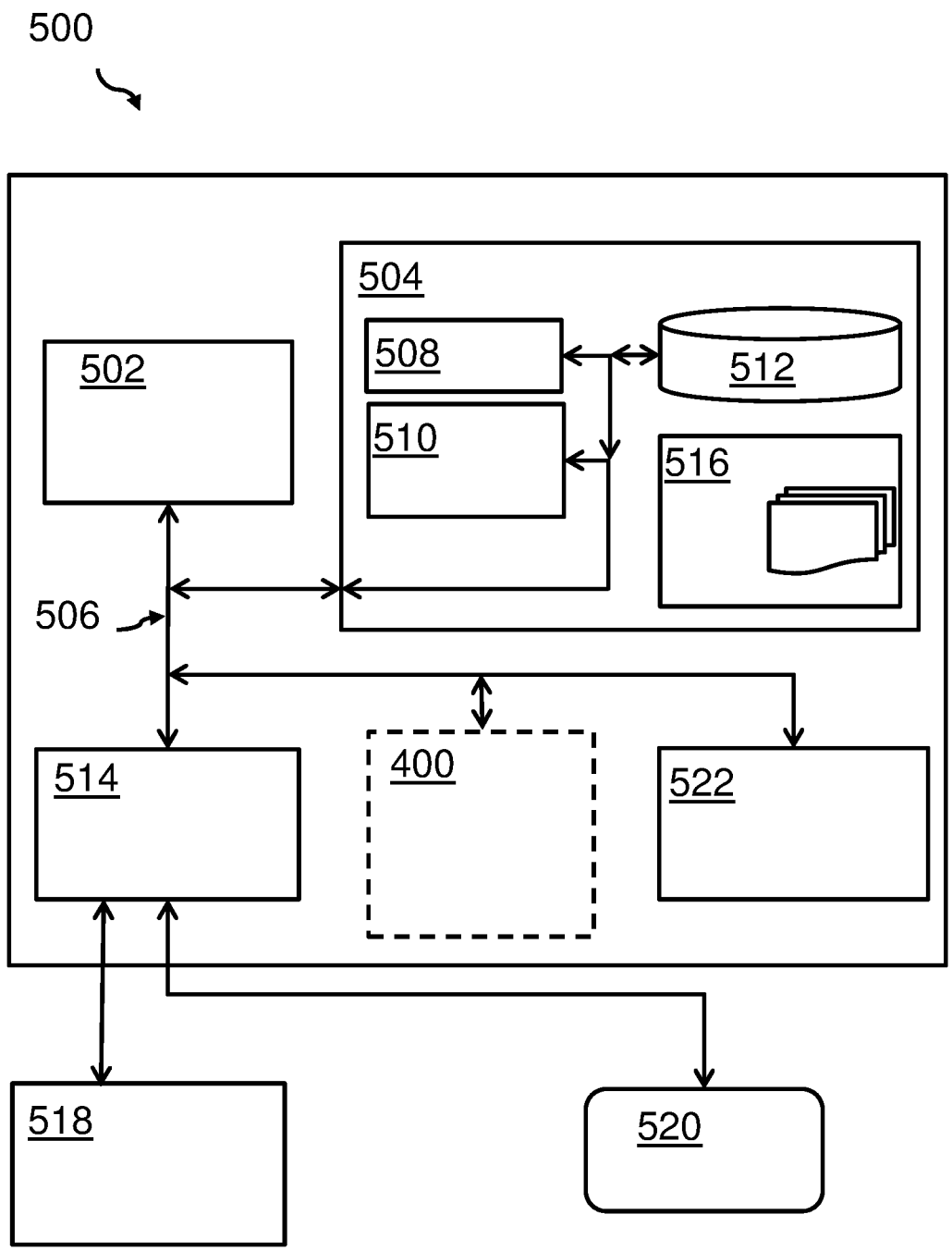

FIG. 5 shows an embodiment of a computing system comprising the data exploration system according to FIG. 4.

Figure 6:
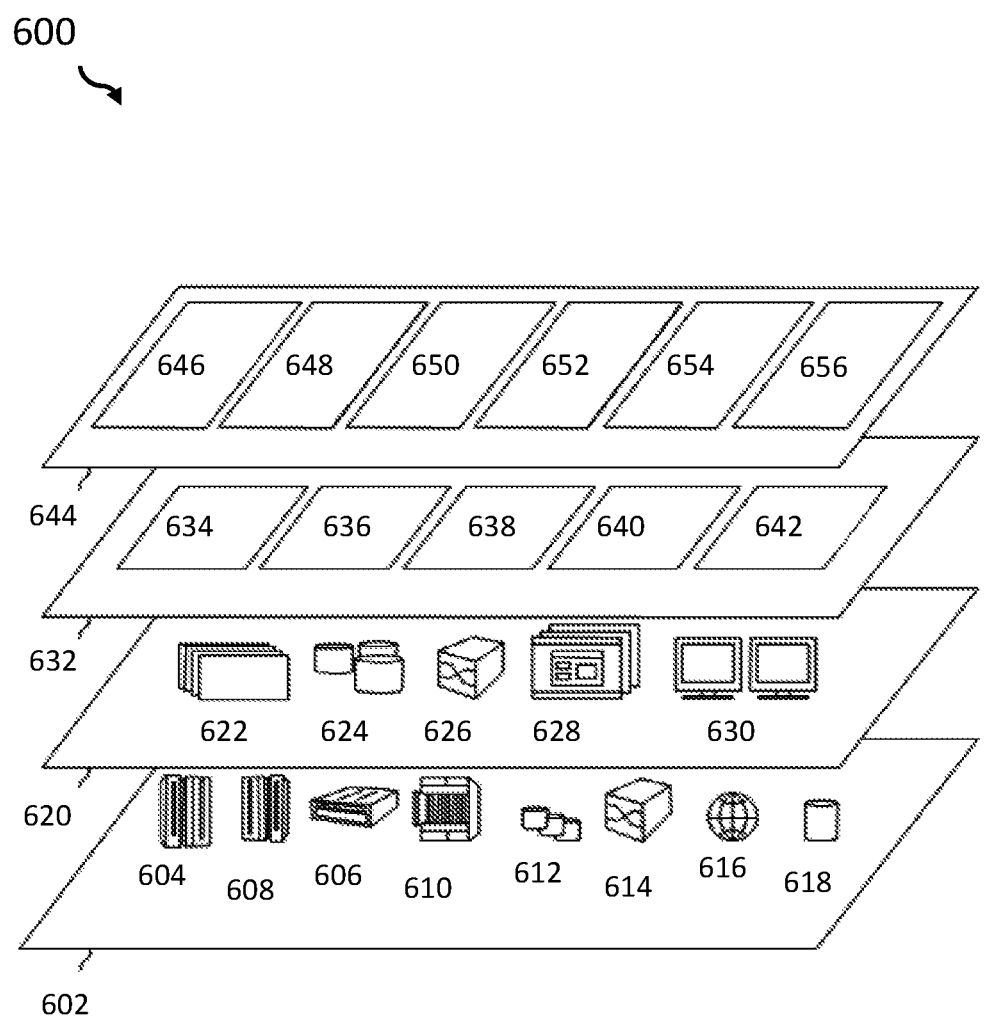

FIG. 6 shows a cloud computing environment in which at least parts of the inventive concept may be deployed, according to an embodiment.

DETAILED DESCRIPTION

In the context of this description, the following conventions, terms and/or expressions may be used:

The term 'quick data exploration' may denote the ability to make assessments by a data scientist (or any other user) about a large (first) data set, typically used for a training of ML-based systems based on analyzing a representative much smaller subset of the large data set. The term may especially relate to the option of assessing a representative subset of a first data set using statistical data metadata about the large, first data set. The quick data exploration may be performed on the local system of the data scientist in contrast to the requirement to access the data on a server-side system. However, it may also be possible to transmit the subset, the statistical data and the metadata from the local system to the server system.

The term 'uploading' may denote here a process of sending or transmitting data, and in various embodiments transmitting a large amount of data, typically stored on a local data storage system, to a remote computer system, e.g., a server, in particular a cloud-based computing system having large amounts of computing resources if compared to the local system.

The term 'local system' may denote a workstation of a data scientist, a personal computer, a thin client such as a web browser, or any other user interface system.

The term 'first data set' may denote a data set typically used for machine-learning purposes, e.g., training data. In general, the amount of the first data set may be so large that a transmission from a local system to a server-side system may take a substantial amount of time, thereby slowing down the activities of the scarce resources of the data scientist. In traditional systems, the data scientist may not be able to work with the first data set during the time, the first data set is transmitted, i.e., uploaded, from the local system to the server.

The term 'corrupted' may denote that the data are not useful, e.g., a wrong checksum at the end of a data transmission, or may otherwise not be transmittable from one computing system to another. It should be appreciated that a data file may be in a corrupted state before it is used or transmitted. Data files may be in various formats, e.g., CSV (comma separated values). As one example, a CSV file may be corrupted for several reasons including invalid formatting, using invalid characters, line breaks within fields, among others.

The term 'second data set' may denote a much smaller data set if compared to the first data set. The typical size of the second data set may be in the range of about 1000 records or even less. However, there may also be a fixed relation between the size of the first and the second data set like $\frac{1}{100}$, $\frac{1}{1,000}$, $\frac{1}{10,000}$ and so on. This fixed relation may be based on a specified sample size. The second data set may be stored on the local system or the second data set may be uploaded to the server. An advantageous characteristic of the second data set, when stored on the local system, is that it may be handled with only very few resources on the local system. On the other side, it may also be easy to access and work with the second data set remotely by the local system via a web browser when the second data set is stored on the server system.

The term 'statistical data' may denote determined and/or calculated information about the first data set. This may comprise, but may not be limited to minimum values in a column, maximum value in a column, median values in a column, mean values in a column, quartile values in a column, frequencies of data in a column, an amount of missing data values and a series of other statistical data which may go beyond the classical meaning of metadata. Statistical data may include a number of values in a data set that do not conform to a specified format for the data set.

The term 'metadata' may denote information about data, in particular the first data set. Typically, metadata are descriptive and relate to structural components or administrative components of reference data of the first data set. Metadata may include, for example, the number of rows and columns that are in data set and the format of the data set. It may be noted that this traditional form of metadata and statistical data about the first data set should be differentiated.

The term 'cloud computing'—and equivalently the term 'cloud-computing based service'—may, in the context of this document, be interpreted as a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of at least five essential characteristics, three service models and four deployment models.

Essential characteristics of cloud computing comprise:
(i) On-demand self-service. A consumer can unilaterally provision computing capabilities, such as server time and network storage, as needed automatically without requiring human interaction with each service provider.
(ii) Broad network access. Capabilities are available over the network and accessed through standard mechanisms that promote use by heterogeneous thin or thick client platforms (e.g., mobile phones, laptops, and PDAs).
(iii) Resource pooling. The provider's computing resources are pooled to serve multiple consumers using a multi-tenant model with different physical and virtual resources, dynamically assigned and reassigned according to consumer demand There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.
(iv) Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.
(v) Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service.

Service models for cloud Computing used comprise:
(i) Cloud Software as a Service (SaaS). The capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.
(ii) Cloud Platform as a Service (PaaS). The capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations.
(iii) Cloud Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise:
(i) Private cloud. The cloud infrastructure is operated solely by an organization. It may be managed by the organization or a third party and may exist on premise or off premise.
(ii) Community cloud. The cloud infrastructure is shared by several organizations and supports a specific community that has shared concerns (e.g., mission, security requirements, policy, and compliance considerations). It may be managed by the organizations or a third party and may exist on premise or off premise.
(iii) Public cloud. The cloud infrastructure is made available to the general public or a large industry group and is owned by an organization selling cloud services.
(iv) Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software takes full advantage of the cloud paradigm by being service-oriented with a focus on statelessness (with exceptions), low coupling, modularity, and semantic interoperability.

In the following, a detailed description of the figures and a preferred embodiment will be given. All instructions in the figures are schematic. Firstly, a block diagram of an embodiment of the inventive computer-implemented method for quick data exploration of data to be uploaded is given. Afterwards, further embodiments, as well as embodiments of the data exploration system for a quick data exploration of data to be uploaded, will be described.

FIG. 1 shows a flow diagram of a preferred embodiment of the computer-implemented method 100 for a quick data exploration of data to be uploaded. The method 100 comprises uploading, 102, from a local system, a—in particular a large—first data set of a first size. The uploading can be performed from a local system like a PC (personal computer), local workstation or local server to a receiving server, which may be a more powerful server having much more computing resources. The uploading can be performed using a thin client, e.g., a web browser running on a PC having relatively small processing and memory resources. Typically, machine-learning algorithms, like training of an ML model or system, may run on the receiving server, e.g., server 214. The receiving server may also be integrated into a larger cloud-computing center. The local system may be a client system or only a web browser.

Additionally, the method comprises determining, 104, that the first data set is not corrupted. If that would be the case, the uploading would not be started (or not completed, if corruption is detected after uploading began) in order to use the effect of fast failure to save time and resources for other efforts. While determining that the first data set is not corrupted, 104, is shown in FIG. 1 following uploading the first data set, 102, it should be appreciated that this sequence is not required. In various embodiments, operation 104 may be performed before or at the same time as operation 102.

Also part of the method 100 is to perform in parallel to the uploading 102, selecting, 106, from the first data set a predefined number of records for building a second data set—thus, a subset which is much smaller in size—determining, 108, statistical data and metadata about the first data set, and visualizing, 110, the second data set, the statistical data and the metadata. The last step may be performed based on server activities—i.e., a request—or local system activities, i.e., a send command. While operations 106, 108, and 110 are preferably performed in parallel with the uploading operation 102, it is not essential that operations 106, 108, and 110 be performed entirely in parallel with operation 102. For example, the operations 106, 108, and 110 may start before or be finished after the uploading operation 102.

FIG. 2 shows a block diagram 200 of a subset of involved technical components for executing the method 100 according to an embodiment. In an ML context, the local system 202 may manage a large data set 208 on a storage system 206, which may be one or more storage devices such as a hard drive or a flash drive, or which may include traditional computer components, such as a processor, bus, and peripheral devices along with one or more storage devices. ML algorithms to be trained may reside on a server 214. A remote access from the server 214 to the storage system 206 may be constrained by low performance characteristics, e.g., substantial amounts of time to complete ML training, and require relatively large amounts of network bandwidth and may thereby not be practical or may be impossible. Thus, it may be required to transfer, upload or send the first data set 208 from the local system 202 to the server 214, as indicated by dashed lines for the large data set 220 in a server-attached storage system 218. The large data set 220 is a copy of the first data set 208 on the storage system 206. That is, a typical size of such first data set 208 may be in the range of 50 GB, 100 GB or even more (e.g., image data). Often, image data may be used as a basis for training of an ML algorithm so it will be appreciated that the mentioned data volumes are not unusual. However, an uploading from the local system 202 to the server system 214 may take a large amount of time, disadvantageously requiring a data scientist to wait until all data have been transferred to the server 214 side, which may require a significant amount of time.

As mentioned, the server 214 may be a more powerful computing system having more computing resources than the local system 202. While the power of the server 214 may be a result of the server having more processing cores, more memory, faster clock speeds, and the like as compared to the local system 202, a particular hardware configuration is not required. In various embodiments, the features that distinguish the server 214 from the local system 202 are throughput, response time, processing speed, or the like. In particular, the server 214 may be distinguished from the local system 202 on the basis that it can train an ML model using the first data set 208/220 in a small fraction of the time that would be required for the local system 202. For example, the server 214 may be able to train an ML model using the first data set 208/220 in 5 or 10 percent of the time that would be required for the local system 202. As a particular example, the server 214 may be able to train an ML model using the first data set 208/220 in 50 minutes, whereas the same task would take 500 minutes (8.3 hours) on the local system 202. In other cases, the time savings may not be as large, but even if the server 214 requires 50 or 75 percent of the time that would be required for the local system 202, the time savings would likely still be significant and advantageous.

In various embodiments, the local system 202 has a first configuration of processing cores and memory capable of training a machine learning model using the first data set in a first time period, and the server 214 has a second configuration of processing cores and memory capable of training the same machine learning model using the same first data set in a second time period. Due to the server 214 being a more powerful system than the local system 202, the second time period is less than the first time period.

According to various embodiments, the data scientist may use the time required for an uploading to explore the data locally in parallel to the uploading and optionally configure data modeling or data manipulation tools.

The local system 202 may be triggered to send, by the sender/uploader 204, the first data set 208 to the server 214 where the first data set is received by a receiver 216. The sender/uploader 204 may include data transmission hardware, such as a modem, and data transmission software that implements data communication protocols, such as TCP, and error detecting protocols. Before (or simultaneous with) the sending, a check may be performed at local system 202 in order to determine the first data set to be uncorrupted. For example, a tool, such as CSVLint may be used to check whether the first data set contains the columns and types of values that it should, i.e., an automated tool may be used to check if file can be parsed and is readable. In case of corrupted data, they would not be sent by the sender/uploader 204. In addition, a check may be performed at receiver 216 to determine that the first data set remained uncorrupted after transmission.

In order to use the time of the transmission from the local system 202 to the server 214, in parallel to the uploading, i.e., data transmission, a subset, i.e., a second data set 210 may be generated out of the first data set 208 (e.g., the subset may be a small portion of the first data set) and, statistical data and metadata 212 about the first data set may also be derived and/or determined from the first data set. The second data set 210, the statistical data and the metadata 212 can be visualized, e.g., displayed on a display device of the local system 202, to the data scientist in order to give them a chance to get a first impression of the data in the first data set. The data scientist may decide to configure a data modeling tool to be applied to the first data set 208 on the basis of the knowledge about the second data set 210 obtained from the visualization. The configuration of the data modeling tool and/or a selection of ML algorithms may be done on the local system 202 or on the server 214. Typically, during this phase, preparative tasks for a data cleansing, data normalization activities are tested on the second data set which may be representative for the first data set. In various embodiments, one or more data cleansing or a data normalization software programs may be applied to the second data set on the local system 204 to determine which of the programs may be most effective and how any parameters of a data cleansing or a data normalization software may be most effectively configured.

Due to the relative high trial and error approaches in ML model development, the proposed method may save a lot of time for the data scientist. The access to the first data set 220 on the server side may be by ML algorithms being executed on the server 214 or another, independent ML system 222, which like the server 214, may be a significantly more powerful server having significantly more computing resources than local system 202.

It may also be noted that the ML algorithms may be embedded into a cloud-computing environment, such as that depicted in FIG. 6, to which the server 214 and the ML system 222 can belong to.

FIG. 3 shows a flowchart 300 of an embodiment of the here proposed concept. It starts at making a first data set available, 302, on a local system, e.g., local system 202. Then the process flow spreads into branches. Firstly, the upload of the first data set is started, 304. As an initial step in this activity, it is determined, 306, whether the first data set is corrupted. Operation 306 may be completed before or performed at the same time as the uploading of the first data set. A software tool, such as CVSLint may be used to determine if first data set is parsable and readable. If the first data set is corrupted so that a risk is present that the transmission from the local system to a server may not be successful, the uploading is stopped, 310. In the second case, in which the first data set is not corrupted, the upload continues, 308, to completion, which may be for a relatively longtime due to the large amount of data to be uploaded.

Secondly, the second data set is extracted, 312, from the first data set. The selection process can be performed in a way that the second data set (denoted DS in the figure) is a good representation of the first data set. For example, to obtain a good representation, the selection process may include random sampling, systematic sampling, stratified sampling, clustered sampling, or a combination of two or more of these techniques. In the case of asymmetric data, a sampling technique may sample the first data set in a manner such that each group of data having a specific aspect, e.g., gender, are equally or proportionally represented in the second data set. In various embodiments, the extracting, 312, the second data set using a selection process may be performed by the local system 202. Next, metadata (denoted MD in the figure) and statistical data (denoted SD in the figure) of the first data set are determined, 314. In various embodiments, the determining MD and SD, 314, may be performed by the local system 202. Then, the statistical data, the metadata and the second data set are visualized, 316, to, e.g., a data scientist for assessing the visualized data on a display device. Optionally, the second data set as well as the statistical data and the metadata of the first data set may be uploaded, 318, to the server (shown in a dashed box) and visualized, 316, in a web browser at local system 202. Next, the data scientist may configure, 320, a tool based on the assessment of the visualized data. The tool may be enabled to normalize, cleanse, correct, etc. the data of the second data set and the first data set; in other words, the tool may be a data modeling tool. While the data modeling tool may be running on the local system 202 in some embodiments, typically, the data modeling tool is only running on the server 214 and is accessed by the data scientist via a web browser at local system 202. When a data modeling tool running on server 214 is used, it is necessary to upload the second data set 210, the MD, and SD to the server 214.

Optionally, the configuration of the data modeling tool may also be uploaded, 322, to the server. Next, the data modeling tool may be applied, 324, to the first data set. Thus, after the upload of the first data set finishes, the data scientist can quickly perform the steps used to prepare the second, smaller data set on the original, large first data set. The data modeling tool may be configured to perform these steps on the first data set in response to a single command, such as "Replace dataset and re-run notebook?" A training 326 of an ML model of an ML system may be started using the first data set after the transmission to the server has successfully ended. In various embodiments, the training of the ML model may begin after the first data set has been transmitted and after a data cleansing or a data normalization of the first data using configuration parameters, determined at local system 202 using the second data set, has been performed. After the training of the ML model is complete, the process may come to an end, 332.

FIG. 4 shows a block diagram of an embodiment of the data exploration system 400 for a quick data exploration of data to be uploaded. The system comprises at least means for uploading—in particular a sender 402 (e.g., sender/uploader 204)—from a local system, a first data set of a first size and means for determining—in particular a first determination unit 404—that the first data set is not corrupted, e.g., a software tool implementing tests to determine if a data file or other data structure is corrupted. Examples include CSVLint and tools that verify checksums. If that would be the case, the sender 402 would not become active.

Additionally, the data exploration system 400 comprises means for selecting—in particular selection unit 406—from the first data set a predefined number of records building a second data set. For example, the selection unit 406 may include software that samples data random sampling, systematic sampling, stratified sampling, clustered sampling, or a combination of two or more of these techniques. The data exploration system 400 also comprises means for determining—in particular a second determination unit 408—statistical data and metadata about the first data set. For example, the second determination unit 408 may include software required to compute statistical data, at least one out of the group, comprising minimum values, maximum values, median values, mean values, quartile values, frequencies of data, an amount of missing data values, and software required to extract metadata, wherein the metadata comprise at least one out of the group comprising number of rows, number of columns, types of column fields. As one example of software for determining statistical or metadata about the first data, a custom or proprietary determination unit 408 may be written in JavaScript for a particular first data set. In addition, custom or proprietary code may be used to determine the size, name, last modified time, and type of file (metadata) using a web browser.

The data exploration system 400 also comprises means for visualizing—in particular a visualization unit 410—the second data set, the statistical data and the metadata. The visualization unit 410 may be any software for visualizing data, e.g. as tables, charts, plain text. Examples of software for visualizing data may be proprietary, open source, or commercially available tools. The software for visualizing data may be written in JavaScript and provide for visualizing data within a web browser. In an embodiment, the visualization unit 410 may be a web-based application accessible through thin client, such as web browser that presents data to be visualized in a table format (row, column, column name) and a panel format (data overview, variable/column overview). The panel format may include information concerning individual variables, such as a histogram for a variable, the mean, median, mode, skewness, kurtosis, minimum, maximum, standard deviation of the variable, whether there are missing values for the variable (and if so how many), and a box plot. For example, the second data set may be visualized in table format. In addition, the first data set may be visualized in panel format. Thereby, the means for selecting, the means for determining statistical data and metadata and the means for visualizing operate timewise in parallel to the means for uploading.

It may be noted that the hardware-implementable unit or modules of the data exploration system 400, i.e., sender 402, the first determination unit 404, the particular selection unit, the second determination unit 408, and the visualization unit 410 can be electrically connected for data exchange. Alternatively they can also be connected via a data exploration system internal bus system for data and signals exchange.

Before turning to FIG. 5, in FIG. 6 a cloud computing environment is shown in which at least parts of the inventive concept—in particular the server-side components—may be deployed.

FIG. 6 shows a cloud computing environment 600 in which at least parts of the inventive concept may be deployed. A set of functional abstraction layers provided by a cloud computing environment is shown. It should be understood in advance that the components, layers, and functions shown in FIG. 6 are intended to be illustrative only and embodiments of the invention are not limited thereto. As depicted, the following layers and corresponding functions are provided: Hardware and software layer 602 include hardware and software components. Examples of hardware components include: mainframes 604; servers 606; RISC (Reduced Instruction Set Computer) architecture based servers 608; blade servers 610; storage devices 612; networks 614 and networking components 614. In some embodiments, software components include network application server software 616 and/or database software 618.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630. In one example, management layer 632 may provide the functions described below. Resource provisioning 634 provides dynamic procurement of computing resources and other resources that are utilized to perform tasks within the cloud computing environment. Metering and pricing 636 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 638 provides access to the cloud computing environment for consumers and system administrators. Service level management 640 provides cloud computing resource allocation and management such that required service levels are met. Service Level Agreement (SLA) planning and fulfillment 642 provides pre-arrangement for, and procurement of, cloud computing resources for which a future requirement is anticipated in accordance with an SLA.

Workload layer 644 provides examples of functionality for which the cloud computing environment may be utilized. Examples of workloads and functions which may be provided from this layer include: mapping and navigation 646; software development and lifecycle management 648; virtual classroom education delivery 650; data analytics processing 652; transaction processing 654; and the server-side components 656 of the here proposed solution.

Embodiments of the invention may be implemented together with virtually any type of computer, regardless of the platform being suitable for storing and/or executing program code. FIG. 5 shows, as an example, a computing system 400 suitable for executing program code related to the proposed method.

The computing system 500 is only one example of a suitable computer system, and is not intended to suggest any limitation as to the scope of use or functionality of embodiments of the invention described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couple various system components including system memory 504 to the processor 502. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limiting, as well as an operating system, one or more application programs, other program modules, and program data. Each of the operating systems, one or more application programs, other program modules, and program data or some combination thereof, may include an implementation of a networking environment. Program modules 516 generally carry out the functions and/or methodologies of embodiments of the invention, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of the computer system/server 500 via bus 506. It should be understood that, although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the data exploration system 400 for a quick data exploration of data to be uploaded may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

In a nutshell, the inventive concept may be summarized in the following clauses:

1. A computer-implemented method for a quick data exploration of data to be uploaded, the method comprising
    uploading, from a local system, a first data set of a first size,
    determining that the first data set is not corrupted,
    in parallel to the uploading performing also
        selecting from the first data set a predefined number of records building a second data set,
        determining statistical data and metadata about the first data set, and
        visualizing the second data set, the statistical data and the metadata.
2. The method according to clause 1, wherein the statistical data comprising at least one out of the group comprising minimum values, maximum value, median values, mean values, quartile values, frequencies of data, an amount of missing data values.
3. The method according to clause 1 or 2, wherein the metadata comprise at least one out of the group comprising number of rows, number of columns, types of column fields.
4. The method according to any of the preceding clauses, also comprising
    sending in parallel to the uploading of the first data set, also the statistical data and metadata.
5. The method according to any of the preceding clauses, wherein the determining that the first data set is not corrupted is performed before the uploading is started.
6. The method according to any of the preceding clauses, wherein a destination of the uploading is a cloud-computing based service.
7. The method according to any of the preceding clauses, also comprising
    configuring a tool by using the statistical data, the metadata and/or the second data set in parallel to the uploading.
8. The method according to clause 7, also comprising
    executing the configured tool on the first data set.
9. The method according to any of the preceding clauses, wherein the size of the second data set is a small fraction of the size of the first data set.
10. The method according to any of the preceding clauses, wherein the selecting from the first data set comprises
    selecting data from the beginning, the middle, the end, randomly or, according to a predefined algorithm from the first data set.
11. A data exploration system for a quick data exploration of data to be uploaded, the system comprising
    means for uploading, from a local system, a first data set of a first size,
    means for determining that the first data set is not corrupted,
    means for selecting from the first data set a predefined number of records building a second data set,
    means for determining statistical data and metadata about the first data set, and
    means for visualizing the second data set the statistical data and the metadata,
    wherein the means for selecting, the means for determining statistical data and metadata and the means for visualizing operate timewise in parallel to the means for uploading.
12. The data exploration system according to clause 11, wherein the statistical data comprising at least one out of the group comprising minimum values, maximum values, median values, mean values, quartile values, frequencies of data, an amount of missing data values.

13. The data exploration system according to clause 11 or 12, wherein the metadata comprise at least one out of the group comprising number of rows, number of columns, types of column fields.

14. The data exploration system according to any of the clauses 11 to 13, also comprising
means for uploading, in parallel to the uploading of the first data set, also the statistical data and metadata.

15. The data exploration system according to any of the clauses 11 to 14, wherein the means for determining that the first data set is not corrupted is executed before the means uploading the first data set is started.

16. The data exploration system according to any of the clauses 11 to 15, wherein a destination of the uploading is a cloud-computing based service.

17. The data exploration system according to any of the clauses 11 to 16, also comprising
means for configuring a tool by using the statistical data, the metadata and/or the second data set in parallel to the uploading.

18. The data exploration system according to clause 17, wherein the configured tool is executed on the first data set.

19. The data exploration system according to any of the clauses 11 to 18, wherein the size of the second data set is a small fraction of the size of the first data set.

20. A computer program product for a quick data exploration of data to be uploaded, the computer program product comprising a computer readable storage medium having program instructions embodied therewith, said program instructions being executable by one or more computing systems or controllers to cause said one or more computing systems to
uploading, from a local system, a first data set of a first size,
determining that the first data set is not corrupted,
in parallel to the uploading performing also
selecting from the first data set a predefined number of records building a second data set,
determining and metadata about the first data set, and
visualizing the second data set, the statistical data and the metadata.

What is claimed is:

1. A computer-implemented method for a quick data exploration of data to be uploaded, the method comprising:
uploading a first data set of a first size from a local system to a server;
determining, by the local system, that the first data set is not corrupted; and
in parallel to the uploading performing:
selecting from the first data set a particular number of records,
building a second data set with the selected records,
determining statistical data and metadata about the first data set,
visualizing the second data set, the statistical data, and the metadata, and
receiving a configuration of a data modeling tool corresponding to the first data set based on data associated with the visualized second data set.

2. The method according to claim 1, wherein the statistical data comprises at least one out of the group comprising: a minimum value, a maximum value, a median value, a mean value, a quartile value, a frequency of a data value, and an amount of missing data values.

3. The method according to claim 1, wherein the metadata comprises at least one out of the group comprising: a number of rows, a number of columns, and types of column fields.

4. The method according to claim 1, further comprising: sending the statistical data and metadata to the server, wherein the sending the statistical data and metadata to the server is performed in parallel to the uploading of the first data set to the server.

5. The method according to claim 1, wherein the determining that the first data set is not corrupted is performed before the uploading is started.

6. The method according to claim 1, wherein the local system has a first configuration of processing cores and memory capable of training a machine learning model using the first data set in a first time period, and the server has a second configuration of processing cores and memory capable of training the machine learning model using the first data set in a second time period, wherein the second time period is less than the first time period.

7. The method according to claim 1, further comprising configuring the data modeling tool using the statistical data, the metadata, or the second data set, wherein the data modeling tool is configured in parallel with the uploading the first data set.

8. The method according to claim 7, further comprising executing the configured data modeling tool on the first data set.

9. The method according to claim 1, wherein the second data set is of a second size, and the first size of the first data set is greater than the second size.

10. The method according to claim 1, wherein the selecting from the first data set comprises: selecting data from a beginning, a middle, an end, randomly or, according to a predefined algorithm from the first data set.

11. A data exploration system for a quick data exploration of data to be uploaded, the system comprising:
a local system having a processing unit and a memory;
a network adapter configured to upload a first data set of a first size from the local system to a server computer system;
a first determining unit configured to determine that the first data set is not corrupted;
a selection unit configured to select from the first data set a particular number of records and build a second data set with the selected records, wherein the selection unit operable to select the particular number of records and build the second data set in parallel to the uploading the first data set to the server computer system:
a second determining unit configured to determine, in parallel to the uploading the first data set to the server computer system, statistical data and metadata about the first data set, and
a visualization unit configured to visualize the second data set, the statistical data, and the metadata in parallel to the uploading the first data set to the server computer system and receive a configuration of a data modeling tool corresponding to the first data set based on data associated with the visualized second data set.

12. The data exploration system according to claim 11, wherein the statistical data comprising at least one out of the group comprising: a minimum value, a maximum value, a median value, a mean value, quartile values, frequencies of data values, and an amount of missing data values.

13. The data exploration system according to claim 11, wherein the metadata comprise at least one out of the group comprising: a number of rows, a number of columns, and types of column fields.

14. The data exploration system according to claim 11, wherein the network adapter is operable to upload, in parallel to the uploading the first data set to the server computer system, the statistical data and the metadata to the server computer system.

15. The data exploration system according to claim 11, wherein the first determining unit configured to determine that the first data set is not corrupted determines that determine that the first data set is not corrupted before the uploading of the first data set to the server computer system is started.

16. The data exploration system according to claim 11, wherein the local system has a first configuration of processing cores and memory capable of training a machine learning model using the first data set in a first time period, and the server has a second configuration of processing cores and memory capable of training the machine learning model using the first data set in a second time period, wherein the second time period is less than the first time period.

17. The data exploration system according to claim 11, further comprising configuring the data modeling tool using the statistical data, the metadata, or the second data set, wherein the data modeling tool is configured in parallel with the uploading the first data set to the server computer system.

18. The data exploration system according to claim 17, further comprising executing the configured data modeling tool on the first data set.

19. The data exploration system according to claim 11, wherein the second data set is of a second size, and the first size of the first data set is greater than the second size.

20. A computer program product for a quick data exploration of data to be uploaded, the computer program product comprising a computer readable storage medium having program instructions embodied therewith, said program instructions being executable by one or more computing systems or controllers to cause said one or more computing systems to:
- upload a first data set of a first size from a local system to a server;
- determine, by the local system, that the first data set is not corrupted; and
- in parallel to the uploading, perform operations including:
  - selecting from the first data set a particular number of records,
  - building a second data set with the selected records,
  - determining statistical data and metadata about the first data set,
  - visualizing the second data set, the statistical data, and the metadata, and
  - receiving a configuration of a data modeling tool corresponding to the first data set based on data associated with the visualized second data set.

* * * * *